United States Patent Office 3,456,881
Patented July 22, 1969

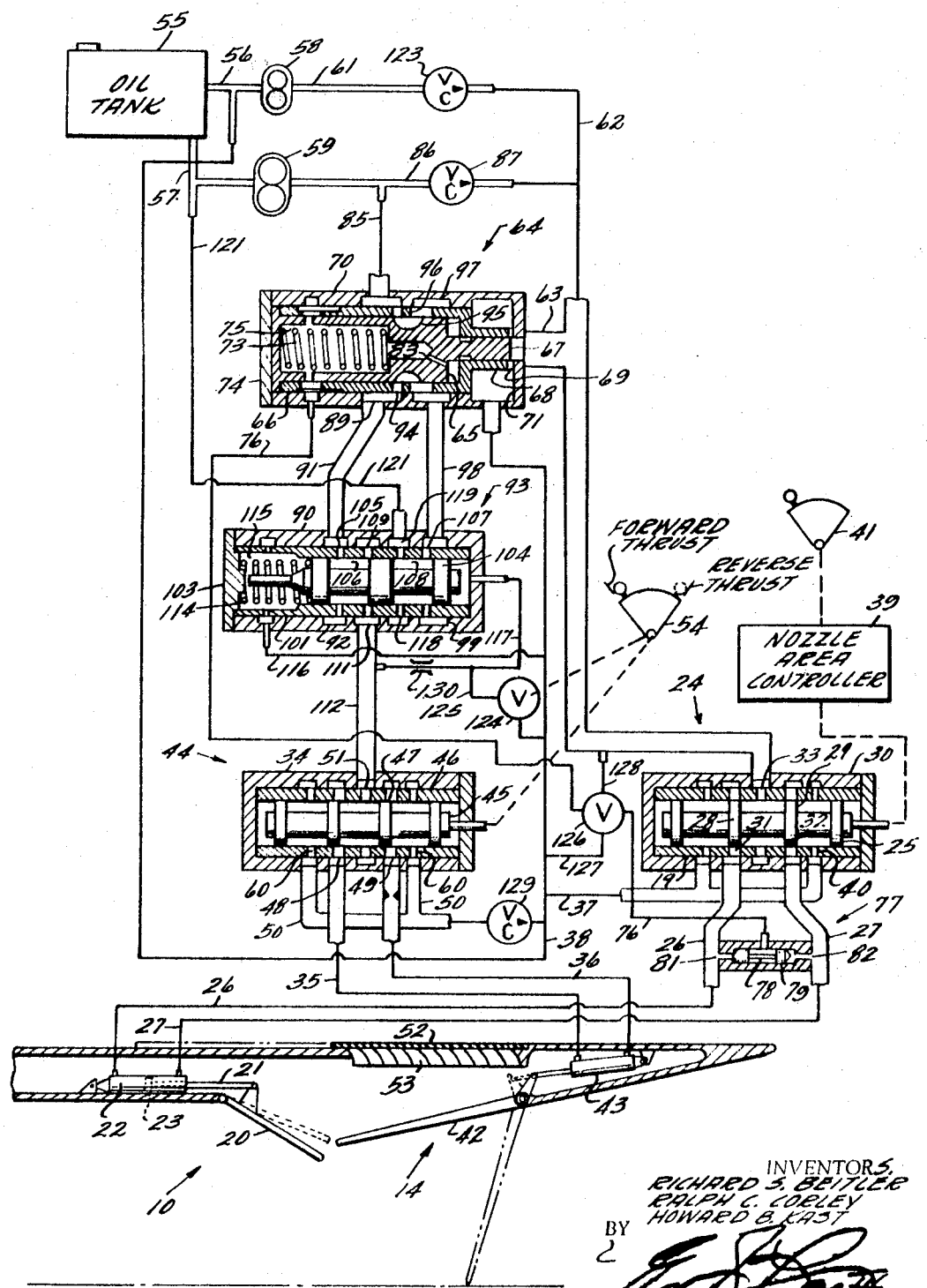

3,456,881
FLUID PRESSURE CONTROL SYSTEM
Richard S. Beitler, Cincinnati, Ralph C. Corley, Wyoming, and Howard B. Kast, Fairfield, Ohio, assignors to General Electric Company, a corporation of New York
Filed Dec. 29, 1966, Ser. No. 605,874
Int. Cl. A01g 25/02
U.S. Cl. 239—265.19                                10 Claims

ABSTRACT OF THE DISCLOSURE

A hydraulic control system employs a large capacity and small capacity pump to provide pressurized oil for actuators controlling the area of a propulsive nozzle and to actuate thrust reverser mechanism. The large pump provides motive power for the system for large movements of the actuators and is switched into operation in response to the rate of flow delivery from the small capacity pump.

The invention described and claimed in the United States patent application herein resulted from work done under United States Government contract FA–SS–64–1. The United States Government has an irrevocable, nonexclusive license under said application to practice and have practiced the invention claimed herein, including the unlimited right to sublicense others to practice and have practiced the claimed invention for any purpose whatsoever.

The present invention relates to a fluid pressure control system and more particularly to such a control system for use with an actuator or actuators.

It is common practice to provide a hydraulic pressure control system for positioning an actuator or actuators. An example of such a use may be found in the controls used with modern aircraft gas turbine engines for maintaining optimum performance and flexibility. Included in these controls are controls for varying the area of the engine exhaust nozzle. Another control necessary to give an engine flexibility is a thrust reverser assembly which diverts the forward thrust of the engine during landing to provide a braking or retarding force. It is common practice to actuate these devices by using pressurized hydraulic fluid. One of the problems in providing a hydraulic pressurization system for this use is that the flow and pressure requirements of the system cover an extremely wide range. For example, during steady state cruise operation of the engine, the flow required from the hydraulic system is only that necessary for small adjustments which may be needed to maintain the variable area nozzle at an optimum position having little or no variation. However, during transient operation of the engine, the area of the exhaust nozzle may be changed at a relatively rapid rate which greatly increases the flow and pressure requirements of the hydraulic system. In addition, when thrust reverser actuation is required, the flow output from the hydraulic pressure control system is extremely high.

In the interest of simplicity and ease of maintenance, it is desirable to provide simplified pumps to pressurize the hydraulic fluid for use by the nozzle variable area control system and the thrust reverser control system. These pumps generally take the form of positive displacement pumps which are driven at engine speed. A problem arises, however, when these pumps are used for the above control systems in that it is necessary to size a single pump to meet the maximum flow requirements of the control system. However, during a major portion of the engine operation the flow requirements of the control systems are relatively low. During this condition, a substantial portion of the hydraulic flow from a single pump is pressurized and then bypassed to a relatively low pressure. This continuous pressurization and recirculation of the hydraulic fluid adds a substantial amount of heat thereto and may create cooling problems when the engine is used for supersonic aircraft. In addition, the added load on the hydraulic pump may impair its useable life.

Accordingly, it is an object of the present invention to provide a simplified, effective hydraulic pressure control system which satisfies broad flow and pressure requirements of an actuator while minimizing the amount of fluid pressurized.

The above ends are achieved in one aspect of the invention with a fluid pressure control system for a displaceable element. The system comprises an actuator for positioning the element and means for controlling the flow of fluid to the actuator to vary the position of the element. The actuator requires a fluid flow rate therethrough directly proportional to the rate at which the element is to be displaced. Fluid pressurizing means connected to the flow control means are provided. The fluid pressurizing means comprises a first pump having a relatively low capacity and supply passageway means providing a flow path from the first pump to the flow control means. Means are provided for maintaining the the pressure in the supply passageway means above a predetermined level. A second pump having a relatively large flow capacity is provided, as a means responsive to the flow rate through the supply passageway means exceeding a given value for pressurizing the output of the second pump and introducing it into the supply passageway. Therefore, only the output of the first pump need be pressurized during relatively slow movements of the actuator and sufficient flow and pressure capacity are provided for relatively rapid movement.

Preferably, the fluid pressure control system further comprises a second actuator for positioning a second element and means for controlling the flow of fluid to the second actuator to vary the position of the second element. Supply passageway means provide a flow path from the second pump to the second flow control means. Means are provided for maintaining the pressure in the second supply passageway means at a predetermined level. Means are provided for controlling the pressure maintaining means to maintain a relatively low pressure in the second supply passageway means independently of the pressure in the first supply passageway when the position of the second actuator is substantially fixed. Means responsive to the actuation of the second flow control means are provided for controlling the pressure maintaining means to pressurize the output of the second pump whereby the output of the second pump is available for movement of the second actuator.

In another aspect of the invention, the above fluid pressure control system is used in combination with a gas turbine engine generating a propulsive gas stream wherein the first element is a variable area exhaust nozzle means and the second element is a thrust reverse means. The thrust reverser means is displaceable between the first position wherein the propulsive gas stream is undeflected and the second position wherein the propulsive gas stream is deflected to produce a reverse thrust. Therefore, only the output of the first pump need be pressurized for relatively slow movement of the variable area exhaust nozzle means and sufficient pressurize flow and pressure capacity are provided for relatively rapid movement of the nozzle area means and the thrust reverser means.

The above and other related objects and features of the present invention will be apparent from the reading of the disclosure found in the accompanying drawing and the novelty thereof pointed out in the appended claims.

The drawing illustrates a fluid pressurization system embodying the present invention for use with an actuator system of a gas turbine engine.

Reference is had to the figure which shows in simplified fashion those portions of an aircraft gas turbine engine convergent divergent exhaust nozzle 10 necessary for an understanding of the present invention. A gas turbine engine (not shown) discharges a hot gas stream through the variable area nozzle 10 to provide a forward propulsive thrust for the engine.

The convergent throat area of the nozzle 10 is defined by the position of a series of circumferentially disposed pivotal flaps 20. The flaps 20 are connected to the piston rods 21 of the series of nozzle actuators 22 by suitable mechanical linkage. A piston 23, secured to the end of the piston rod 21, is positioned in each actuator 22 by fluid pressure signals from a control valve 24 via a pair of conduits 26 and 27. The piston 23 is provided with a bleed passageway (not shown) to provide continuous circulation of fluid therethrough for cooling purposes.

The control valve 24 comprises a valve element 25 displaceable in a sleeve 19 which is secured in a casing 30. The valve element 25 has a pair of lands 28, 29 which cooperate with a pair of outlet ports 31, 32 to selectively direct pressurized fluid from an inlet port 33 to the conduit 27 or 26, or both, to provide continuous fluid circulation when the actuator 22 is maintained in a fixed position. A second pair of outlet ports 40 provide a return flow path, or fluid, from conduits 26 or 27 to a passageway 37 and a low pressure return passageway 38.

The valve element 25 is positioned through suitable means by a nozzle area controller 39 which receives control inputs from an operator controlled engine power lever 41. The engine power lever 41 also provides control inputs to other engine operating components. Additional control inputs reflecting selected engine operating parameters may be provided, as is apparent to those skilled in the art to achieve an exhaust nozzle area giving optimum forward thrust from the engine 10 during normal aircraft operation.

Under certain aircraft operating conditions, such as a landing maneuver, it may be necessary to divert the forward thrust of the engine 10 to provide a braking action. For this purpose, a thrust reverser 14 is provided. The thrust reverser 14 may comprise a series of circumferentially disposed flaps 42 adapted to be extended into the annular gas stream from the gas turbine engine by thrust reverser actuators 43 to divert the gas stream to a forward direction and thus provide reverse thrust. The thrust reverser actuators 43 have essentially two positions and the actuators are selectively maintained in these positions by fluid pressure signals from a thrust reverser control valve 44 via a pair of conduits 35, 36.

The control valve 44 comprises a valve element 45, displaceable in a sleeve 46 which is secured in a casing 34. The valve element 45 has a pair of lands 47 which cooperate with a pair of outlet ports 48, 49 to selectively direct pressurized fluid from an inlet port 51 to conduit 35 or 36, or both, for cooling purposes. A second pair of outlet ports 60 provide a return flow path for fluid from the actuators 43 through passageways 50 and past a check valve 129 to the return passageway 38. The valve element 45 is displaced by an operator controlled thrust reverser lever 54 from its illustrated position, wherein the thrust reverser flaps 42 are retracted, to the phantom position calling for thrust reverser operation, wherein the flaps 42 are extended to block the gas turbine engine discharge stream. At the same time the flaps 42 are extended, a cover 52 is displaced by suitable means (which may also be powered by the actuator 43) to provide a flow path, for the blocked gases, through a series of diverter flaps 53 to direct the gases in a forward direction and provide a reverse thrust.

During steady state operation of the engine 10, the pressure and flow rate of the fluid required by the nozzle area control valve 24 is generally relatively low. However, during transient operation, such as acceleration or deceleration, when the throat area of the nozzle 10 is rapidly changed, the fluid required is substantially increased. In like fashion, the pressure and flow of the fluid used by the thrust reverser control valve 44 is very small for a major portion of an aircraft mission but is substantially increased during landing when the thrust reverser 14 is actuated. In accordance with the present invention, the control valves 24 and 44 are supplied by a fluid pressurizing system which provides the necessary flow and pressure requirements of the actuators and minimizes excess pressurization of fluid steady state operation of the engine 10.

The fluid pressurization system comprises a supply tank 55 for the hydraulic fluid. Conduits 56 and 57 extend from the tank 55 to a pair of engine driven pumps 58 and 59.

The pump 58 pressurizes the fluid for delivery through a conduit 61 past a check valve 123 to a supply passageway 62 which extends to the inlet port 33 of the control valve 24. A passageway 63 extends from the supply passageway 62 to a pressure control bypass valve 64. The pressure control valve 64 comprises a valve element 65 displaceable in a sleeve 66 which is secured in a housing 70. A plunger 67, integral with the valve element 65 is displaceable in a reduced diameter portion 68 of the sleeve 66. The reduced diameter portion 68 of the sleeve 66 has a series of ports 69 which provide a flow path from the passageway 63 to an annular chamber 71 when the valve element is displaced to the left or to an open position. The low pressure return passageway 38 extends from the chamber 71 to the inlet conduit 56 for the pump 58.

A spring 73 acting against a compositely formed cap 74 defining in part a chamber 75, urges the valve element 65 towards a closed position. A passageway 76 extends from the chamber 75, via valve 126, to a pressure selector valve 77. The pressure selector valve 77 comprises a valve element 78 reciprocable in a bore 79 to selectively seat against a pair of passageways 81, 82 extending respectively to passageways 26, 27. Longitudinal grooves (not shown) in the valve element 78 provide a selective flow path from the conduits 26, 27 to the chamber 75. A pressure equalizing passageway 83 transmits the pressure in chamber 75 the opposite end of the valve element 65 to achieve equal and opposite areas over which the fluid pressures from the selector valve 77 and the supply passageway 62 act. As a result, the force tending to close the valve element 65 is a predetermined amount above the higher of the fluid load pressures for the nozzle actuators 22 to maintain a constant pressure differential across the control valve 24. Whenever the fluid pressure in passageways 62 is above this level, the valve element 65 is displaced to an open position to permit a controlled bypass flow through ports 69 to the return conduit 38.

The pump 59 pressurizes the fluid for delivery through a conduit 86, past a check valve 87, to the passageway 62. A conduit 85 provides another flow path to an annular chamber 89, surrounding the sleeve 66 of the valve 64. A passageway 91 extends from chamber 89 to an inlet chamber 92 of a combination pressure control throttling valve 93. A series of inlet ports 94 are provided in the sleeve 66 of the valve 64 to provide a flow path from the chamber 89 through an annular groove 95 and outlet ports 96 to an annular chamber 97 whenever the valve element 65 is displaced to almost uncover the pressure regulating ports 69. A passageway 98 extends from the chamber 97 to a second inlet chamber 99 for the pressure control valve 93.

The pressure control valve 93 comprises a sleeve 101 secured in a casing 90 which is sealed at one end by a cap 103. A valve element 104 is displaceable in the sleeve 101. A first series of ports 105 in the sleeve 101 provide a flow path from the inlet chamber 92 to an annular groove 106 in the valve element 104 and a second series of ports 107 provide a flow path from the other inlet chamber 99 to a second annular groove 108. A series of throttling ports 109 provide a flow path from the groove 106 to an annular chamber 111 when the valve element is displaced to the right. A second supply passageway 112 extends from the chamber 111 to the inlet port of the thrust reverser control valve 44. A spring 114, disposed in a chamber 115, urges the valve element 104 towards a position wherein the flow through the ports 109 is unthrottled. Passageways 116 and 117 respectively connect the chamber 115 and the opposite end of the sleeve 101 to the return passageway 38 and the passageway 112 so that the valve element 104 throttles the flow of hydraulic fluid therethrough to maintain the pressure in passageway 112 at a minimum necessary to maintain the thrust reverser actuators 43 in a retracted position and provide a flow of fluid therethrough for cooling purposes.

A second series of outlet ports 118 in the sleeve 101 provide a flow path from the annular groove 108 to an annular chamber 119 which is connected to the inlet of the pump 59 via a passageway 121 when the valve element 104 is positioned to throttle flow through the ports 109.

During normal steady state operation of the engine 10, the flow through the control valves 24 and 44 is at a minimum as there is little or no movement of the actuators 22 and 43. The valves, at this time, are in the position shown. The pump 58 is sized to supply the requirements of the control valve 24 (actuator 22) and any excess output is by passed through the ports 69 to the low pressure return passageway 38. At the same time a portion of the flow from the pump 59 is delivered through the throttling ports 109 to maintain the pressure in passageway 112 sufficient for cooling flow through the thrust reverser actuators 43. The output of the pump 59, which is sized to supply at least the transient requirements of the control valve 24, is then bypassed at this relatively low pressure through the ports 94 of the valve 64 and the ports 118 of the valve 93 to the pump inlet. If the flow from the pump 59 is insufficient to maintain the required pressure in passageway 112, as during a relatively low level of engine operation, the valve element 104 strokes to unthrottle the flow through ports 109 and then restricts the bypass flow of the pump 59 through ports 118.

When the flow output of the pump 58 is insufficient to maintain the required pressure in passageway 62, as during rapid changing of the nozzle area, the valve element 65 strokes to cover first the ports 69 and then the ports 94.

The entire output of the pump 58 then passes to the control valve 24 and the bypass flow from the pump 59 is terminated. The pressure in inlet passageway 85 builds up until it exceeds the pressure in passageway 62 at which point the check valve 87 opens to permit flow into the passageway 62 from the pump 59 to supplement the output of pump 58. It should be noted that the check valve 123, provided in the inlet passageway 62, prevents flow of hydraulic fluid out of passageway 62 into the conduit 61, should the output pressure of pump 59 exceed that of pump 58.

During the above condition the pressure in passageway 112 is regulated as in steady state operation by the throttling action of ports 109 (valve 93). The pressure in passageway 62 continues to be maintained at a predetermined level above the nozzle area actuator pressure load. However, the bypassing of flow to regulate the pressure in passageway 62 is preferentially throttled through the ports 94, which are disposed to open before the ports 69. This is done because more effective pressure regulation may be achieved during this condition by bypassing the output of pump 59 since it may, at times, be operating below its maximum capability.

When the flow and pressure requirements of the control valve 24 drop to a relatively low level, as in steady state operation, the valve element 65 is displaced to uncover ports 94 and permit full bypass flow therethrough as the valve element 65 moves to regulate the pressure in passageway 62 by throttling flow through ports 69.

When it is desired to actuate the thrust reverser 14, the exhaust nozzle actuators 22 are placed in an extreme open condition wherein the pistons 23 are bottomed in the actuators to permit maximum gas flow from the nozzle 10. The pressure in the passageway 62 then builds up to an extremely high level due to a substantial reduction in flow of fluid to the actuator when it is bottomed and terminates the bypass flow through ports 69 and 94. After the nozzle actuators 22 are in a fixed position, the thrust reverser controller lever 54 is moved to a reverse thrust position (shown in phantom) which causes the thrust reverser control valve 44 to port the output of the pump 59 to the conduit 36 for extending the flaps 42 into a reverse thrust position.

At the same time, the control lever 54 is moved to thrust reverse position, the pressure on both sides of the valve element 104 is equalized by the opening of a valve 124 in a passageway 125 extending from passageway 38 to passageway 117. Thus, the spring 114 urges the valve element 104 to a position where flow through ports 109 is unthrottled and flow through port 118 is prevented. The valve 124 may be actuated as shown or by movement of the nozzle actuators to their extreme position. An orifice 130 disposed in passageway 117 between passageways 125 and 112 minimizes the outflow from passageway 112. As a result, essentially the full pressurized output of the pump 59 is available for displacing the thrust reverser actuators 43 into position.

It should be noted that during thrust reverser operation, the load pressure applied to the valve element 65 of the valve 64 is at a maximum due to the bottoming of the pistons 23 in the nozzle actuators 22 which would keep the ports 94 and 69 closed and permit the pump output pressures to build up to an unduly high level. To prevent this buildup, the valve assembly 126, disposed in the passageway 76, is adapted to throttle fluid from the output of valve 77 to the low pressure return passageway 38 via a passageway 127 whenever the pressure in passageway 62, as sensed through passageway 128, is above a predetermined level.

The pressure applied to the valve element 65 is then reduced which causes it to translate to a position where the ports 94 and 69 are opened. Since the bypass flow from the ports 94 is blocked by the vave 93, the bypass flow to regulate the hydraulic pressure is through ports 69 which insures that the maximum output of pump 59 is available for thrust reverser actuation. Accordingly, the pump 59 is sized to handle the maximum requirements of the thrust reverser control system which are generally higher than the transient thrust requirements of the nozzle area control. When the thrust reverser flaps 42 are retracted, valve 124 is closed which causes the valve element 114 to displace into the position for regulating cooling flow to the thrust reverser actuators 43 and bypassing flow from pump 59 to its inlet.

It is apparent from the foregoing that the fluid pressurization system described above minimizes the amount of fluid pressurized during steady state operation of the engine 10, but makes that pump's output available to supply the hydraulic fluid needs during transient engine operation and during thrust reverser operation.

The above described pressure control system provides an additional benefit, namely, isolation of the fluid flow path to the nozzle area control valve 24 from the flow path to the thrust reverser control valve 44 to insure nozzle area control if a leak develops in the thrust reverser assembly.

In this connection, it should be noted that the check valves 87 and 129, respectively, prevent flow from the passageways 62 and 38 to the passageways 86 and 50. Thus, if a leak develops in the flow path between the pump 59 and the thrust reverser control valve 44, thereby lowering the fluid pressure, the check valves prevent flow thereto to insure that a pressurized fluid supply is available at all for control of the nozzle area during steady state operation of the gas turbine engine. In addition, the low pressure return passageway 38 is connected to the inlet pump 58 so that if the bypass flow from the pump 59 is great enough to deplete the fluid in the tank 55, fluid will be available at the inlet of pump 58 for pressurization.

The present invention is not limited to use with a nozzle area control and thrust reverser system of a gas turbine engine, but may be used with any actuator or actuators having substantial flow change requirements.

While the preferred embodiment of the present invention has been described, modifications will occur to those skilled in the art without departing from the spirit of the present invention.

Having described the invention, what is claimed as novel and desired to be secured by Letters Patent of the United States is:

1. A fluid pressure control system for a displaceable element, said system comprising:
   an actuator for positioning the element,
   means for controlling the flow of fluid to said actuator to vary the position of said element,
   said actuator requiring a fluid flow rate therethrough directly proportional to the rate at which the element is to be displaced,
   fluid pressurizing means connected to the flow control means and comprising:
   a first pump having a relatively low flow capacity,
   supply passageway means providing a flow path from said first pump to said flow control means,
   means for maintaining the pressure in said supply passageway means above a predetermined level,
   a second pump having a relatively large flow capacity,
   means responsive to the flow rate through said supply passageway means exceeding a given value for pressurizing the output of said second pump and introducing it into said supply passageway,
   whereby only the output of said first pump need be pressurized during relatively slow movements of said actuator and sufficient flow and pressure capacity are provided for relatively rapid movements.

2. A fluid pressure control system as in claim 1 wherein said fluid pressure control system further comprises:
   a second actuator for positioning a second element,
   means for controlling the flow of fluid to said second actuator to vary the position of said second element,
   supply passageway means providing a flow path from said second pump to said second flow control means,
   means for maintaining the pressure in said second supply passageway means at a predetermined level,
   means for controlling said pressure maintaining means to maintain a relatively low pressure in said second supply passageway means independently of the pressure in said first passageway when the position of said second actuator is substantially fixed, and
   means responsive to the actuation of said second flow control means for controlling said pressure maintaining means to pressurize the output of said second pump,
   whereby the output of said second pump is available for movement of said second actuator.

3. A fluid pressure control system as in claim 1 wherein;
   said first supply passageway pressure maintaining means is adapted to regulate the pressure in said first supply passageway means at a predetermined level above the fluid pressure downstream of said first flow control means,
   said flow responsive means includes:
   means for providing a flow path from said second pump to said first supply passageway when the pressure output of said second pump is higher than the pressure in said first supply passageway,
   whereby when said first actuator is displaced to an extreme fixed position and the pressure downstream of said flow control means is increased to a relatively high level, the output of said second pump is pressurized to a relatively high level for rapid movement of said second actuator.

4. A fluid pressure control system as in claim 3 wherein;
   said pressure maintaining means comprises valve means responsive to the pressure in said first supply passageway and the pressure downstream of said first flow control means for bypassing fluid from said first pump to a low pressure point to maintain the pressure in said first supply passageway means at said predetermined level,
   said flow responsive means further includes valve means responsive to the pressure in said first supply passageway and the pressure downstream of said flow control means for bypassing fluid from the output of said second pump to a low pressure point to maintain the pressure output from said second pump at a relatively low level when the flow output from said first pump is sufficient to maintain said predetermined pressure in the first supply passageway means,
   whereby when the flow output from said first pump is insufficient to maintain said predetermined pressure in said first passageway said valve means reduces the flow to said low pressure point to pressurize the second pump.

5. A fluid pressure control system as in claim 4 wherein said bypass valve means comprise:
   a first bypass passageway providing a flow path from said first pump to a low pressure point,
   a second bypass passageway providing a flow path from said second pump to a low pressure point,
   a single valve element displaceable in said first and second bypass passageways between two positions, one of which provides a relatively low restriction to flow through said second valve passageway and a relatively high restriction to flow through said first bypass passageway, and the other of which terminates flow through both of said bypass passageways,
   said pressure control system further comprises:
   means for applying the fluid pressure in said first passageway to one end of said valve element for urging said valve element towards said first mentioned position,
   means for applying the fluid pressure downstream of said first flow control means to the opposite end of said valve element,
   whereby the pressure maintained in said first passageway is at least as high as the fluid load pressure required by said actuator.

6. A fluid pressure control system as in claim 5 wherein;
   said first actuator comprises a chamber and a piston reciprocable therein,
   said piston having a bleed passageway therethrough permitting continuous flow of fluid through said actuator irrespective of its rate of movement,
   said flow control means is adapted to selectively control the flow of fluid to the ends of said chamber to displace said piston,
   said means for applying the fluid pressure downstream of said flow control means comprises valve means for selectively applying the higher of the fluid pressures in said hydraulic control means passageways to said opposite end of said valve element,
   whereby the pressure in said first passageway is maintained at a level higher than the fluid pressure loads in said passageways.

7. A fluid pressure control system as in claim 6 wherein said second supply passageway pressure control means comprises:
- first throttling valve means responsive to the pressure upstream of said second flow control means for regulating the flow thereto to maintain said predetermined pressure,
- second throttling valve means responsive to the pressure upstream of said second flow control means for regulating the bypass flow from said second pump to maintain the pressure upstream of said second flow control means at said predetermined level.

8. A fluid pressure control system as in claim 7 wherein said first and second throttling valve means comprise:
- a throttle valve element disposed in the bypass passageway from said second pump and the second supply passageway for providing variable restrictions to flow therethrough and displaceable between a position wherein the flow through said second supply passageway means is fully throttled and the flow through said second pump bypass passageway is unrestricted and a position wherein the flow through said second supply is unthrottled and the flow through said second pump bypass passageway is restricted, said pressure controlling means comprises:
- means for yieldably urging said throttle valve element towards said last mentioned position,
- passageway means for applying the fluid pressure in said second supply passageway upstream of said second flow control means to said valve element for urging it towards the first mentioned position.

9. A fluid pressure control system as in claim 8 in combination with a gas turbine engine generating a propulsive gas stream wherein;
- said first element is a variable area exhaust nozzle means,
- said second element is a thrust reverser means displaceable between a first position wherein said propulsive gas steam is undeflected and a second position wherein the propulsive gas stream is deflected to produce reverse thrust,
- said second flow control means is adapted to control flow of fluid to said second actuator for displacing said thrust reverse means between said positions,
- said means responsive to the actuation of said second flow control means for pressurizing the output of said second pump comprises:
- valve means for lowering the pressure from said second supply passageway applied to said throttling valve element, whereby said throttle valve element is displaced to said position wherein the flow through said second supply passageway is unthrottled and the flow through said second bypass passageway is terminated.

10. A fluid pressure control system as in claim 9 wherein;
- said variable area exhaust nozzle means is displaced to an extreme position for actuation of said thrust reverser means, whereby the output of said second pump is pressurized to a relatively high level for rapid movement of said thrust reverser means,
- said pressure control system further comprises:
- valve means for limiting the pressure from downstream of said first flow control means applied to said bypass valve element,
- whereby said first and second pumps are pressurized to a predetermined maximum level.

References Cited

UNITED STATES PATENTS 3,350,986  11/1967  Berta et al. _____ 60—52 X

M. HENSON WOOD, Jr., Primary Examiner

M. MAR, Assistant Examiner

U.S. Cl. X.R.

60—52, 230; 103—5; 244—85